United States Patent [19]

Harvest et al.

[11] Patent Number: 4,811,189
[45] Date of Patent: Mar. 7, 1989

[54] AC RECTIFIER CIRCUIT WITH MEANS FOR LIMITING THE RECTIFIED VOLTAGE

[75] Inventors: Nils-Ole Harvest; Jørgen Rasmussen, both of Nordborg, Denmark

[73] Assignee: Danfoss A/S, Nordborg, Denmark

[21] Appl. No.: 173,862

[22] Filed: Mar. 28, 1988

[30] Foreign Application Priority Data

Apr. 10, 1987 [DE] Fed. Rep. of Germany ....... 3712244

[51] Int. Cl.4 ............................................. H02H 7/125
[52] U.S. Cl. ....................................... 363/53; 363/54; 363/87; 363/88; 363/128; 363/129
[58] Field of Search ........................ 363/53, 54, 85, 87, 363/88, 128, 129, 49

[56] References Cited

U.S. PATENT DOCUMENTS 4,376,968  3/1983  Wueschinski et al. ................ 363/88
4,573,113  2/1986  Bauman ................................ 363/53
4,574,341  3/1986  Hallagaard et al. .................. 363/56

Primary Examiner—Patrick R. Salce
Assistant Examiner—Jeffrey Starrett
Attorney, Agent, or Firm—Wayne B. Easton

[57] ABSTRACT

The invention relates to an AC voltage supplied rectifier circuit with a downstream smoothing capacitor. A prior art problem with this type of circuit was that the inductive impedance of the supply voltage caused a practically umdamped oscillation between the inductive supply impedance and the smoothing capacitor during start-up which caused the voltage to rise to about twice the stationary value. A rectifier circuit is provided which substantially prevents the over-oscillation having at least one controllable rectifier which brings the rectifier to a conductive state during the charging period of the smoothing capacitor over such a time that the output direct voltage of the rectifier circuit exceeds the momentary capacitor voltage by no more than a predetermined limited value.

14 Claims, 2 Drawing Sheets

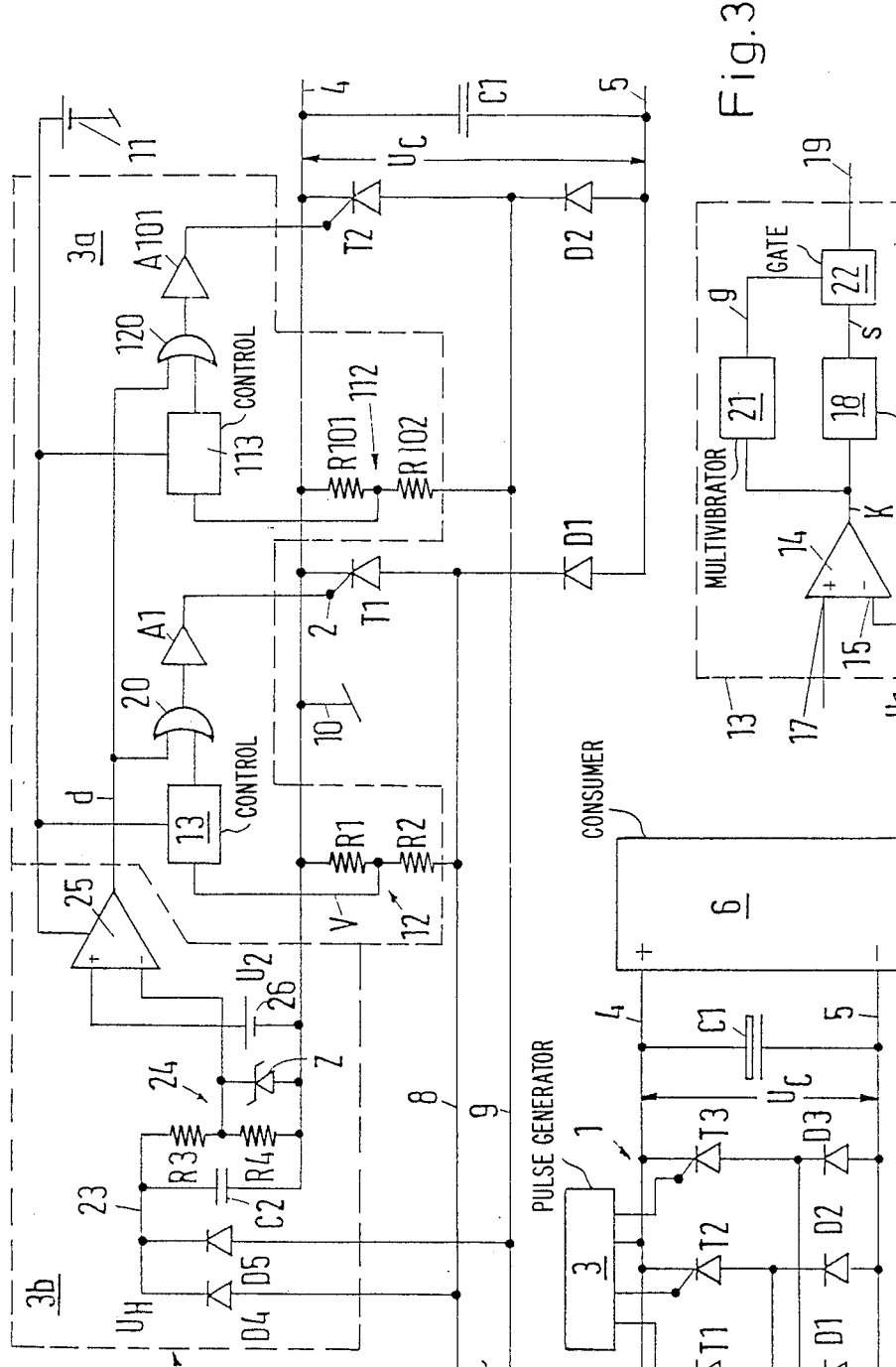

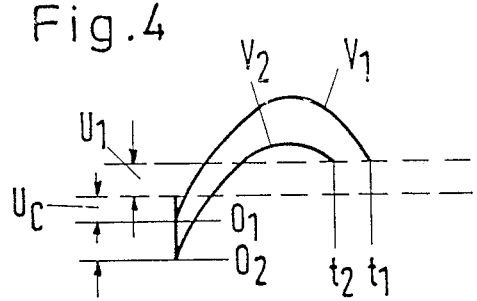
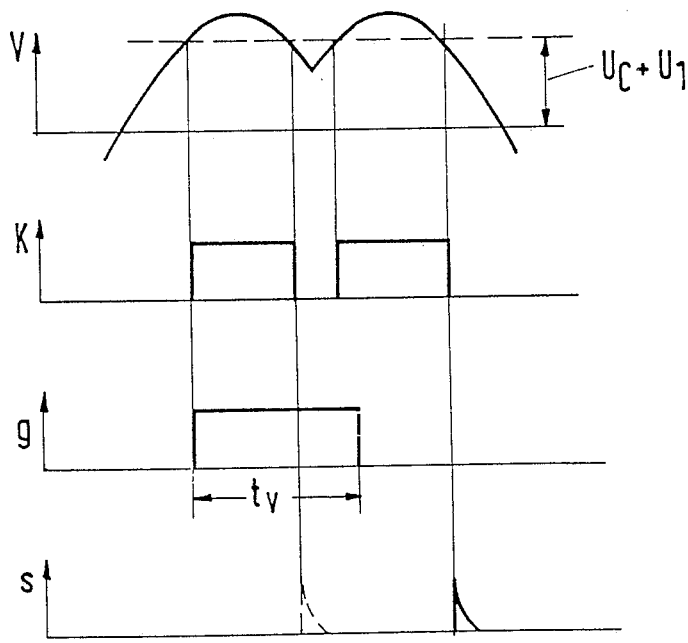

AC RECTIFIER CIRCUIT WITH MEANS FOR LIMITING THE RECTIFIED VOLTAGE

BACKGROUND OF THE INVENTION

The invention relates to an alternating voltage-fed rectifier circuit with a downstream smoothing condenser, particularly for the DC supply of an asynchronous motor operated by way of an inverse rectifier.

Such a rectifier circuit is known from U.S. Pat. No. 4,574,341. Since the impedance of the alternating voltage supply mains is predominantly inductive and mains throttle coils may also be provided, a practically undamped oscillation is produced between the impedance on the mains side and the smoothing condenser when switching on. At this time, the voltage can rise to about twice the stationary value. Especially in the case of higher voltages, for example 380 V alternating voltage corresponding to a direct voltage of about 500 V, this leads to a considerable disadvantage because the smoothing condenser and the following power-semiconductor have to be designed for twice the voltage. In addition, the diodes of the rectifier and any fuses are subjected to a strong current pulse.

SUMMARY OF THE INVENTION

The invention is therefore based on the problem of providing a rectifier circuit of the aforementioned kind in which over-oscillation of the voltage is substantially prevented to avoid the stated disadvantages.

This problem is solved according to the invention in that at least one rectifier of the rectifier circuit is controllable and that a control circuit is provided which brings the rectifier, into the conductive state during the charging period of the smoothing condenser over such a time, shortened relatively to a half wave, that the output direct voltage of the rectifier circuit exceeds the momentary condenser voltage by no more than the pre-determined limited value.

In this way, one achieves slow charging of the smoothing condenser. This is because, since the charging voltage pre-determined by the direct output voltage only slightly exceeds the momentary condenser voltage, the charging current is also limited. Excessively high voltages are avoided with certainty.

If the rectifier circuit comprises a rectifier bridge, it will be sufficient for only one rectifier of each pair of bridge branches to be controlled. This results in a particularly simple circuit.

This is especially so if the controllable rectifiers are thyristors because in that case a simple pulse will be sufficient for operation.

In a preferred embodiment, a comparitor compares the sum of a fixed reference value and the momentary condenser voltage with the amplitude of the alternating voltage and brings the controllable rectifier into the conductive state when the amplitude falls below the sum. By means of simple output signals, the comparator ensures that the charging voltage of the condenser during each half period exceeds the condenser voltage by only the reference value. This takes place until the amplitude of the half wave of the alternating voltage or the voltage across the controllable rectifier no longer reaches the sum of the condenser voltage and the reference value by reason of increasing condenser voltage. In this way, the current is held substantially constant during charging.

In particular, the one input of the comparator may be fed with the reference value and the other input with a value proportional to the voltage at the controllable rectifier. This results in a simple construction.

It is particularly recommended that the comparator be followed by a differentiating element to determine when the amplitude falls below the sum. The delivered control pulse can be used to operate a thyristor directly if it has the polarity corresponding to falling below the sum.

It is also very favourable for the comparator to be associated with a monostable multivibrator which responds when the amplitude exceeds the sum, is set to a delay period corresponding to at least the phase displacement between two half waves, and blocks the operation of the associated controllable rectifier during this delay period. Especially in the case of a three multi-phase rectifier circuit, one can in this way avoid incorrect operation of the controllable rectifier as will hereinafter be described in more detail.

It is also recommended to provide a second control circuit which holds the controllable rectifier in the conductive state during the entire pass period when the smoothing condenser has been charged to the full direct voltage. When this condition has been achieved, the controllable rectifiers are triggered by the second control circuit so that they will operate like an uncontrolled rectifier.

In particular, this second control circuit may comprise a second comparator which compares a second reference value with the difference between the momentary condenser voltage and a value proportional to an auxiliary direct voltage derived from rectification of the alternating voltage and brings the controllable rectifier to the conductive state when the difference exceeds the second reference value. The first and second reference values can be so tuned to each other that charging smoothly changes to permanent operation.

Considerable simplification in the circuitry is obtained if the plus conductor of the rectifier circuit is connected to the thyristors and forms the control circuit reference potential. The control circuit need therefore not be galvanically separated from the rectifier circuit.

It is in this case advantageous within the scope of the first control circuit for the thyristors to be bridged by a voltage divider from the tapping of which a conductor leads to the non-inverting input of the comparator and for a reference value voltage source 16 to be connected between the plus conductor and the inverting input of the comparator.

The second control circuit is preferably designed so that, to produce the auxiliary direct voltage, each phase is connected by way of an auxiliary rectifier to an auxiliary condenser of which the other connection is connected to the plus conductor, that the auxiliary condenser is bridged by an auxiliary voltage divider of which the tapping is connected to the inverting input of the second comparator, and that a voltage source for the second reference value is connected between the plus conductor and the non-inverting input of the comparator.

As a further development, a voltage limiter such as a Zener diode may be connected between the tapping of the auxiliary voltage divider and the plus conductor. This serves to protect the second comparator.

A preferred example of the invention will now be described in more detail with reference to the drawing, wherein:

BRIEF DESCRIPTION OF THE DRAWINGS

FIG. 1 is a diagrammatic representation of a 3-phase rectifier circuit according to the invention;

FIG. 2 is the circuit diagram of one embodiment of a single phase rectifier circuit with associated control circuits;

FIG. 3 is an embodiment of a control block of FIG. 2;

FIG. 4 is a graph of the voltage, at a thyristor against the time, and

FIG. 5 shows the voltages occurring at different locations of the circuit.

DESCRIPTION OF PREFERRED EMBODIMENT

FIG. 1 illustrates a 3-phase bridge rectifier circuit 1 to which 3-phase alternating voltage is fed by way of the phase conductors R, S and T from the mains. Each bridge branch consists of a controllable rectifier T1, T2 and T3, in the form of a thyristor and an uncontrolled diode D1, D2 and D3. The control connections 2 of the thyristors are supplied with control pulses from a control circuit arrangement 3. Accordingly, a direct voltage is produced on the output side between a plus conductor 4 and a minus conductor 5. This direct voltage is smoothened with the aid of a smoothing condenser C1. The direct voltage feeds a consumer 6 consisting, for example, of an asynchronous motor of which the speed can be regulated by way of a regulator.

In operation, the direct voltage between the conductors 4 and 5 is held constant by the condenser C1. However, when the rectifier 1 is operated by way of the mains switch 7, an excessive voltage can occur on the output side of the rectifier circuit 1 through the combination of the mains inductance and the smoothing condenser C1 unless this is avoided by the controllable rectifiers T1, T2, T3 and the associated control circuit arrangement 3.

FIG. 2 illustrates a 4-way rectifier bridge circuit for single phase operation. Only two bridge branches T1-D1 and T2-D2 are provided. The alternating voltage is supplied by way of two mains conductors 8 and 9. The plus conductor 4 is applied to a reference potential 10 such as earth. The control circuit arrangement consists of a first control circuit 3a which is operative during starting, and a second control circuit 3b which is responsible for permanent operation. Both control circuits are supplied with operating voltage from a common voltage source 11. The controllable rectifiers T1 and T2 in the form of thyristors lie on the side of the bridge facing the plus conductor 4 as in the case of the FIG. 1 example.

The first control circuit 3a comprises a voltage divider 12 consisting of the resistors R1 and R2 and being connected in parallel to the controllable rectifier T1. The tapping leads to a control block 13 which is shown in FIG. 3. It comprises a comparator 14 of which the inverting input 15 is applied to a reference voltage source 16 and the non-inverting input 17 is connected to the tapping of the voltage divider 12. The output of the comparator 14 is connected to a differentiating element 18 which delivers a control pulse s when the voltage at the input 17 of the comparator 14 falls below the reference value $U_1$ at the input 15. This control pulse is fed by way of the output 19 to an OR element 20 of which the output is applied by way of an amplifier A1 to the control connection 2 of the controllable rectifier T1 to ignite this thyristor. A similar control circuit is provided for the second controllable rectifier T2, its components bearing reference numerals increased by 100.

For 3-phase operation, the control block 13 also includes a monostable multivibrator 21 which responds when the voltage at the input 17 of the comparator 14 exceeds the reference value $U_1$. During the delay period, the multivibrator delivers a blocking signal g to a gate 22 which prevents the transmission of the control pulse s during this delay period, as will be explained in more detail in conjunction with FIG. 5.

The second control circuit 3b comprises two diodes D4 and D5 which connect the two mains leads 8 and 9 to a reference conductor 23 which carries an auxiliary voltage $U_H$, namely the actual value of the rectified alternating voltage. This reference conductor 23 is connected by way of an auxiliary condenser C2 to the plus conductor 4 at the output of the rectifier circuit. Its charging voltage is therefore equal to the difference between the voltages at the conductors 4 and 23. A voltage divider 25 consisting of the resistors R3 and R4 bridges the auxiliary condenser. The tapping is safeguarded against over-voltage by means of a Zener diode. It is connected to the inverting input of a second comparator 25 of which the non-inverting input is supplied with a second reference voltage $U_2$ from a voltage source 26. As soon as the voltage at the tapping of the voltage divider 25 becomes less than the reference voltage $U_2$, the comparator 25 delivers a permanent signal d as a control signal to the controllable rectifiers T1 and T2 by way of the OR element 20, 120, so that these rectifiers permanently remain in the conductive state. The comparator 25 therefore determines that the charging state is almost completed and the normal operation of the thyristors can therefore take place.

FIG. 4 shows the voltage V occurring at the tapping of the voltage divider 12 in relation to the charging operation. Since the plus conductor 4 is at reference potential, the diagram has been selected so that the zero line 0 of the voltage applied to the thyristor is displaced downwardly with increasing condenser voltage $U_c$, for example from $O_1$ to $O_2$. The reference value $U_1$ is added to the condenser voltage. When the condenser C1 is only little charged, one can for example obtain the curve $V_1$ at the tapping of the voltage divider 12. The small downwardly running peak at the start occurs because the voltage across the thyristor T1 is at this instant pulled downwardly because the diode D1 connected to the minus conductor 5 becomes momentarily conductive and the other thyristor T2 was simultaneously conductive. The comparator 14 in the control block 13 detects when the voltage sum $U_c + U_1$ is exceeded by the curve V1 and when the curve falls below it again. When falling below it, that is to say at the instant $t_1$, the differentiating element 18 delivers a control pulse s which brings the associated thyristor to the conductive state. When the condenser C1 is more fully charged, the voltage curve $V_2$ is obtained. It will be seen that the control pulse s is produced at an earlier instant $t_2$ and therefore a larger proportion of the voltage phase is utilised for the direct voltage supply. In this way, the output voltage of the rectifier circuit is automatically adapted to the charging voltage $U_c$ of the smoothing condenser C1.

In a 3-phase bridge rectifier, the voltage V tappable at the voltage divider 12 has a behaviour as shown in the first line of FIG. 5. Upon little charging of the smoothing condenser C1, the reference line $U_c + U_1$ intersects the voltage curve twice. The comparator 14 therefore delivers an output signal k which consists of two pulses with decreasing sides. This would lead to two control pulses s in the differentiating element 18. However, the first control pulse has to be suppressed because the direct output voltage would be too large. Accordingly, on exceeding the voltage sum, the monostable multivibrator 21 is operated and this delivers a blocking signal g during the delay period $t_v$. The delay period should at least equal the phase spacing between the half waves in the case of 3-phase mains, i.e., at least 60°. However, it could be somewhat larger. In this way, one obtains problem-free operation.

Because the thyristors are connected to the plus conductor 4, the control circuit 3 may also lie at the same potential. Galvanic separation of the control circuit is therefore avoided. In some cases it is favourable for the reference voltage $U_1$ to be adjustable. Even if one operates with a maximum direct voltage of 500 V, the comparator 25 can be operated with comparatively low voltages. Thus, the voltage tapped at the voltage divider 24 can be ten or twenty times smaller. The second reference value $U_2$ should likewise lie below 10 L V.

We claim:

1. A circuit for supplying a rectified and smoothed voltage, said circuit comprising:
   a rectifier circuit having input means for receiving an alternating voltage, output means for outputting a rectified output voltage, a plurality of interconnected rectifying elements for rectifying the voltage input via said input means, and at least one rectifying element having associated therewith controllable means operable to enable or inhibit conduction through said one rectifying element during the half wave period in which the element is forwardly biassed;
   A shunt capacitor connected across said output means for smoothing the voltage output from said rectifier circuit; and
   control means responsive to the momentary voltage of said capacitor during an initial charging period of said capacitor to control said controllable means to enable conduction through said at least one rectifying element except when said output voltage of said rectifier exceeds said momentary voltage by a preset amount.

2. A circuit as recited in claim 1, wherein said rectifier circuit comprises a rectifier bridge having two pairs of branches each including a rectifying element, a respective one rectifying element in each pair of branches having said controllable means associated therewith, each of said controllable means being controlled by a respective control means.

3. A circuit as recited in claim 1, wherein said controllable means associated with at least one said rectifying element is a thyristor.

4. A circuit as recited in claaim 3, wherein the positive conductor of the rectifier circuit is connected to said thyristor and forms the control circuit reference potential.

5. A circuit as recited in claim 1, which includes further control means responsive to said momentary voltage for causing said at least one rectifying element to conduct during the half wave period in which the rectifying element is forwardly biassed when the smoothing capacitor has been substantially fully charged.

6. A circuit as recited in claim 1, wherein said control means includes first comparator and means for providing a fixed reference value, and said first comparator is operable to compare the sum of said fixed reference value and said momentary voltage with the amplitude of the voltage across said at least one rectifying element and to enable conduction through said at least one rectifying element when the amplitude is less than the sum.

7. A circuit as recited in claim 6, wherein one input of said first comparator is supplied with said fixed reference value and the other input is supplied the sum of said momentary voltage and a voltage proportional to that existing across said at least one rectifying element.

8. A circuit as recited in claim 7, wherein the output of said first comparator is supplied to a differentiator to determine whether the amplitude is less than the sum.

9. A circuit as recited in claim 6 or 7, wherein said controllable means is a thyristor, said thyristor is bridged by a voltage divider and a signal tapped from said voltage divider is supplied to the non-inverting input of said first comparator and a reference voltage source is connected between the positive conductor and the inverting input of said first comparator.

10. A circuit as recited in claim 6 or 7, wherein said control means includes a second comparator which compares a second reference value with the difference between said momentary voltage and a value proportional to an auxiliary direct voltage derived from rectification of the alternating voltage input to the rectifier circuit and causes said at least one rectifying element to conduct when the difference is less than the second reference value.

11. A circuit as recited in claim 10, wherein, to produce an auxiliary direct voltage, each phase of said input alternating voltage is connected by way of a respective auxiliary rectifying element to one input of an auxiliary capacitor, the other input of said auxiliary capacitor being connected to said positive conductor with said auxiliary capacitor being bridged by an auxiliary voltage divider with the tapping thereof being connected to the inverting input of said first comparator, and a voltage source for said reference value is connected between the positive conductor and the noninverting input of said first comparator.

12. A circuit as recited in claim 11, wherein a voltage limiter is connected between said tapping of said auxiliary voltage divider and said positive conductor.

13. A circuit as recited in claim 12, wherein said voltage limiter is a zener diode.

14. A circuit as recited in claim 6, wherein said first comparator has associated therewith a monostable multivibrator operable to inhibit conduction of said at least one rectifying element until a preset period following the change of state of said first comparator, said preset period being at least as long as the phase difference between two successive half waves.

* * * * *